(12) United States Patent
Mitzel et al.

(10) Patent No.: US 9,976,877 B2
(45) Date of Patent: May 22, 2018

(54) NON-CONTACT SENSOR FOR ELECTROMAGNETIC ACTUATOR ASSEMBLY FOR A LOCKING ASSEMBLY

(71) Applicant: Dana Automotive Systems Group, LLC, Maumee, OH (US)

(72) Inventors: Anne M. Mitzel, Milan, MI (US); Michael Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 6 days.

(21) Appl. No.: 15/307,022

(22) PCT Filed: Apr. 28, 2015

(86) PCT No.: PCT/US2015/027865
§ 371 (c)(1),
(2) Date: Oct. 27, 2016

(87) PCT Pub. No.: WO2015/168046
PCT Pub. Date: Nov. 5, 2015

(65) Prior Publication Data
US 2017/0045379 A1    Feb. 16, 2017

Related U.S. Application Data

(60) Provisional application No. 61/985,582, filed on Apr. 29, 2014.

(51) Int. Cl.
*G01D 5/14* (2006.01)
*F16H 48/34* (2012.01)
(Continued)

(52) U.S. Cl.
CPC ............. *G01D 5/147* (2013.01); *F16H 48/34* (2013.01); *H01F 7/064* (2013.01); *H01F 7/081* (2013.01);
(Continued)

(58) Field of Classification Search
CPC .... F16H 2048/346; F16H 48/24; F16H 48/34; G01D 5/147; G01D 5/145; H01F 7/064; H01F 7/081
(Continued)

(56) References Cited

U.S. PATENT DOCUMENTS 4,351,254 A * 9/1982 Brown ................... D05B 69/26
112/275
5,126,663 A * 6/1992 Shinjo ....................... F02P 7/07
123/617
(Continued)

FOREIGN PATENT DOCUMENTS

WO    2008066669 A2    6/2008

OTHER PUBLICATIONS

International Search Report and Written Opinion for Application No. PCT/US2015/027865, dated Aug. 5, 2015, issued by the European Patent Office.

*Primary Examiner* — Jay Patidar
(74) *Attorney, Agent, or Firm* — Marshall & Melhorn, LLC

(57) ABSTRACT

The present invention relates to sensing engaged/disengaged modes of an electromagnetic actuator assembly, such as can be used in a locking differential or other locking gearset. Described herein is a sensor for sensing such engagement/disengagement and methods of using such a sensor. The sensor has a magnet having a north and south pole, a Hall element, and a ferrous target, wherein the ferrous target
(Continued)

moves relative to the Hall element and magnet as a result of a position of the locking gearset.

13 Claims, 3 Drawing Sheets

(51) Int. Cl.
*H01F 7/06* (2006.01)
*H01F 7/08* (2006.01)
*F16H 48/24* (2006.01)

(52) U.S. Cl.
CPC ........ *F16H 48/24* (2013.01); *F16H 2048/346* (2013.01)

(58) Field of Classification Search
USPC ............................ 324/207.2, 207.24, 207.25
See application file for complete search history.

(56) References Cited

U.S. PATENT DOCUMENTS

| | | |
|---|---|---|
| 5,196,794 A * | 3/1993 | Murata ................. F02P 7/07 174/558 |
| 6,457,545 B1 | 10/2002 | Michaud et al. |
| 7,264,568 B2 | 9/2007 | Ludwig et al. |
| 7,425,185 B2 | 9/2008 | Donofrio et al. |
| 7,534,187 B2 | 5/2009 | Donofrio et al. |
| 7,572,202 B2 | 8/2009 | Donofrio et al. |
| 7,602,271 B2 | 10/2009 | York et al. |
| 7,682,279 B2 | 3/2010 | Donofrio et al. |
| 7,744,500 B2 | 6/2010 | Donofrio et al. |
| 7,764,154 B2 | 7/2010 | York et al. |
| 7,785,224 B2 | 8/2010 | York et al. |
| 7,825,759 B2 | 11/2010 | York et al. |
| 7,837,585 B2 | 11/2010 | Pinkos et al. |
| 7,876,186 B2 | 1/2011 | York et al. |
| 7,942,780 B2 | 5/2011 | Donofrio et al. |
| 8,057,345 B2 | 11/2011 | Pinkos et al. |
| 2007/0068499 A1 * | 3/2007 | Schneider ............ G01D 5/2013 123/568.16 |
| 2008/0042791 A1 | 2/2008 | York et al. |

* cited by examiner

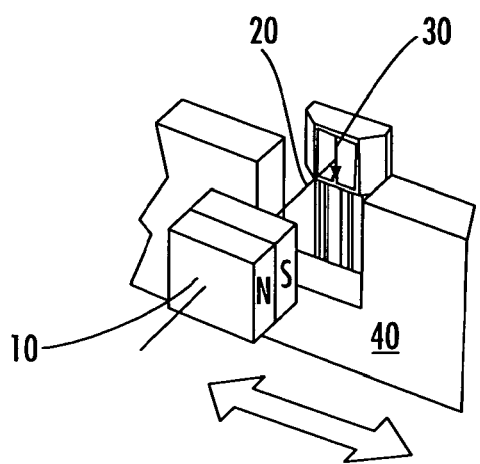 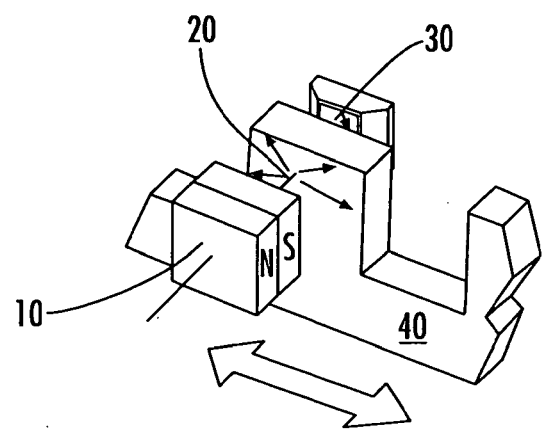
FIG. 1A
PRIOR ART
FIG. 1B
PRIOR ART

NON-CONTACT SENSOR FOR ELECTROMAGNETIC ACTUATOR ASSEMBLY FOR A LOCKING ASSEMBLY

FIELD OF THE INVENTION

The present invention relates to sensing engagement/disengagement of an electromagnetic actuator assembly. In certain embodiments, the electromagnetic actuator assembly is part of a locking differential assembly or other locking gearset assembly.

BACKGROUND OF THE INVENTION

Certain locking gearsets can switch between an engaged and disengaged state. A vehicle differential carrier (commonly known merely as a "differential") contains such a type of gear. As context, the differential employs differential gears therein, which typically are connected to its exterior by three shafts. An input shaft transmits torque and rotation into the differential gears from a vehicle engine. In turn, each of the other two shafts separately transmit a portion of the torque and rotation from the differential gears out to separate external wheels. Regarding the operation of the differential, when a vehicle is being driven straight the differential rotates with an axle, while side and pinion gears mate but do not rotate relative to each other. However, when the vehicle turns the differential still rotates but the side and pinion gears mate and slightly rotate so that one wheel can turn faster than the other.

Hence, the differential is needed because when a vehicle is turning, as it quite often does, the outside wheel makes a larger radius than the inside wheel. As a result, the outside wheel goes a farther distance, moves faster and turns more revolutions than the inside wheel. If, however, both wheels were on the same axle shaft, in this instance, one or both wheels would have to skid or slip to make a turn. Consequently, the function of the differential allows the wheels to turn at different speeds, but at equal torque.

In certain situations it is desirable to lock the differential so that the two wheels on an axle are restricted to the same rotational speed without regard to available traction or differences in resistance seen at each wheel.

Control of the locking of the differential involves several actions. Engagement of the differential is controlled by an actuator assembly. The actuator assembly is powered and signaled by the vehicle through a controller. As is known in the art, the actuator assembly contains, along with other components, a solenoid which converts electrical current into a mechanical force. The flow of electrical current through the coil of the solenoid creates a magnetic field that moves the magnetoresponsive plunger of the solenoid, and thereby engaging or disengaging the actuator assembly, and therefore the gearset.

In addition, it is beneficial to have a sensor that can relay information regarding the mode of the actuator assembly back to the controller. A sensor provides a signal that is indicative of the engaged/disengaged mode of the actuator assembly. The technology described herein relates to such a sensor. These sensors are sometimes referred to as switches or positional switches.

Prior art mechanical positional sensors can have wear or mounting issues. Magnetic proximity sensors can have accuracy problems based on runout and are subject to interfering fields from adjacent electromagnetic solenoid. However, the proposed solution herein has no mechanical contact with moving parts, is less sensitive to runout, and can be made less sensitive to external magnetic fields.

The current design employs the known Hall type sensor (also known as a Hall element) using vane interruption. A Hall type sensor is a transducer that varies its output voltage in response to a magnetic field. Hall effect sensors are used extensively for proximity switching, positioning, speed detection, and current sensing applications. If the magnetic field near the Hall type sensor is interrupted or disturbed, the output voltage varies accordingly. Vane interruption is achieved when a ferrous material (the vane) is placed in between a magnet producing a magnetic field and the Hall sensor. The basic principal of this effect is shown in FIGS. 1A and 1B. FIG. 1A shows a magnet 10 producing a magnetic field 20 that can be sensed by the Hall sensor 30. FIG. 1B shows the magnetic field 20 being interrupted by a vane of ferrous material 40. The current design utilizes this principle to create a positional sensor for a locking gearset, such as a differential.

Advantageously, the current design is largely insensitive to runout of the moving part being sensed. Another advantage of the embodiments described herein is that different sensor orientations are possible to minimize magnetic field interference from the solenoid. Concentrators can be used to direct the sensor field and increase efficiency. In addition, some magnet orientations that can be used in the embodiments described herein can be coated in a thicker layer of non-magnetic material, reducing pick-up of ferrous particles.

SUMMARY OF THE INVENTION

In one embodiment, described is an electromagnetic actuator assembly having non-engaged and engaged modes where the actuator assembly has a solenoid; a plate axially displaced from the solenoid, the plate having a first side facing the solenoid and a second side facing away from the solenoid; a ferrous target attached to the second side of the plate; a sensor disposed radially outward from the ferrous target; and a magnet disposed radially inward from the ferrous target, where, in the non-engaged mode of the actuator assembly, the ferrous target is not interposed between the sensor and the magnet, and where, in the engaged mode of the actuator assembly, the ferrous target is interposed between the sensor and the magnet.

Also described is a method of sensing the mode of an electromagnetic actuator assembly. The method includes providing a solenoid; providing a plate axially displaced from the solenoid, the plate having a first side facing the solenoid and a second side facing away from the solenoid; providing a ferrous target attached to the second side of the plate; providing a sensor disposed radially outward from the ferrous target; and providing a magnet disposed radially inward from the ferrous target; where, in the non-engaged mode of the actuator assembly, the ferrous target is in a first position not interposed between the sensor and the magnet, and where, in the engaged mode of the actuator assembly, the ferrous target is in a second position interposed between the sensor and the magnet and wherein the ferrous target is caused to move between the first and second positions as a result of the actuator assembly changing from the non-engaged mode to the engaged mode.

In some embodiments the sensor is a Hall-effect sensor. In others, the actuator assembly is part of a rotating locking gearset assembly. Various embodiments describe a ferrous target that rotates with the locking gearset assembly. In certain embodiments, the magnet has a north pole directed radially inward toward an axis of rotation and a south pole directed radially outward from an axis of rotation. In other embodiments, the magnet has a north pole and a south pole, where the north pole and the south pole are radially equidistant from an axis of rotation and oriented in a circumferential direction. Some actuator assemblies of the embodiments described herein also have at least one concentrator disposed adjacent to the sensor. Some actuator assemblies of the embodiments described herein also have at least two magnets. Others also have at least two sensors. In some embodiments, the Hall element is oriented to sense in a circumferential direction.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 shows the principle of a vane interruption type Hall sensor, as known in the prior art.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting.

Figure 2:
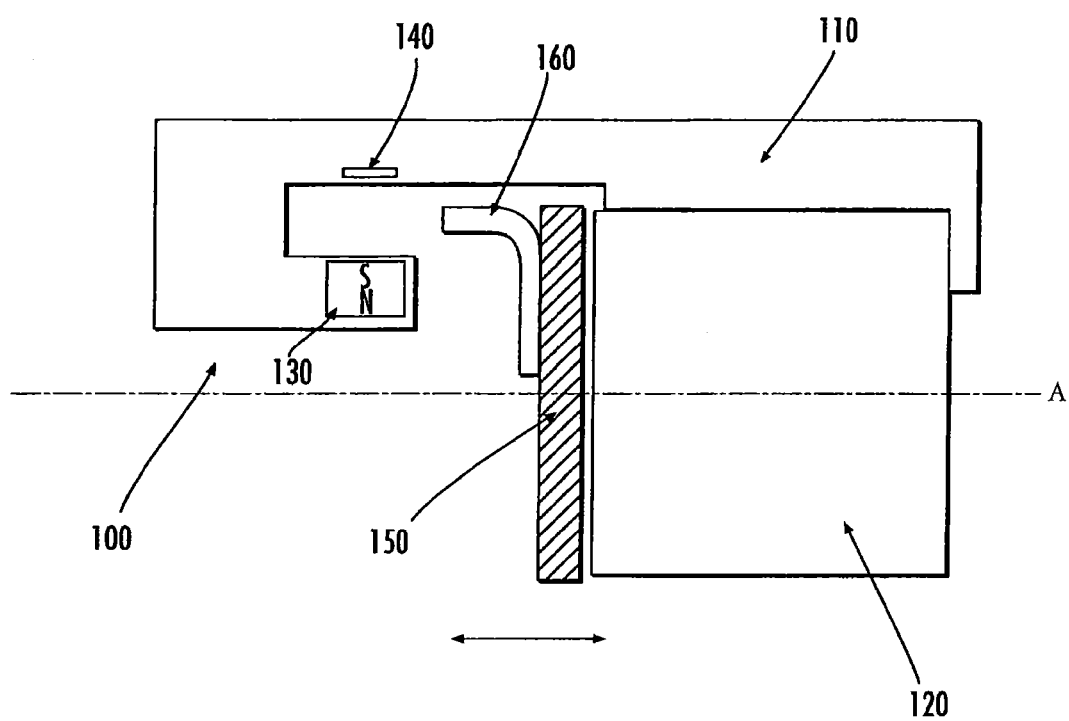
FIG. 2 is a cutaway view of an electromagnetic actuator assembly in accordance with an embodiment of the invention.

FIG. 2 shows a cutaway view of the body of a sensor 110 mounted on a solenoid 120. To assist in orientation, an axis of rotation A is shown. Axial movement is indicated by the double headed horizontal arrow. This basic design is intended to be an example to assist in the explanation of how a vane interruption type Hall sensor may be used for a differential or other locking gearset. The sensor 100 can also contain a magnet 130 oriented with its south pole pointing radially outward toward a Hall element 140. The solenoid 120 causes a plate 150 of nonmagnetic material to move axially (arrows), which in turn is responsible for moving the locking mechanism of the gearset (not shown). In addition, the plate 150 will cause to be moved a ferrous target 160. The ferrous target 160 is attached to the plate 150 such that when the plate 150 moves the locking mechanism into engagement, the ferrous target 160 interrupts the magnetic field between the Hall element 140 and magnet 130. The ferrous target 160 or 260 may be a ring. The sensor 100 can transition (i.e. turn on or off) at a particular location of the ferrous target 160 based on the magnetic field level at the Hall element 140. In such an embodiment, the transition point is largely insensitive to runout. In other words, because the sensor 100 uses vane interruption style of magnetic sensing, it is less sensitive to the runout of rotating part being sensed. Alternatively, the sensor 100 can be a linear sensor, where the output of the Hall element 140 changes with the axial location of the ferrous target 160.

The sensor 100 can be mounted on an actuator 120 or other part of the locking apparatus. The magnet 130 can be stationary. The ferrous target 160 can be attached to a moving part of the locking gearset and can rotate with the gearset, such as the plate 150. The sensor 100 senses the axial position of the ferrous target 160 when it moves between the magnet 130 and Hall element 140.

Figure 3:
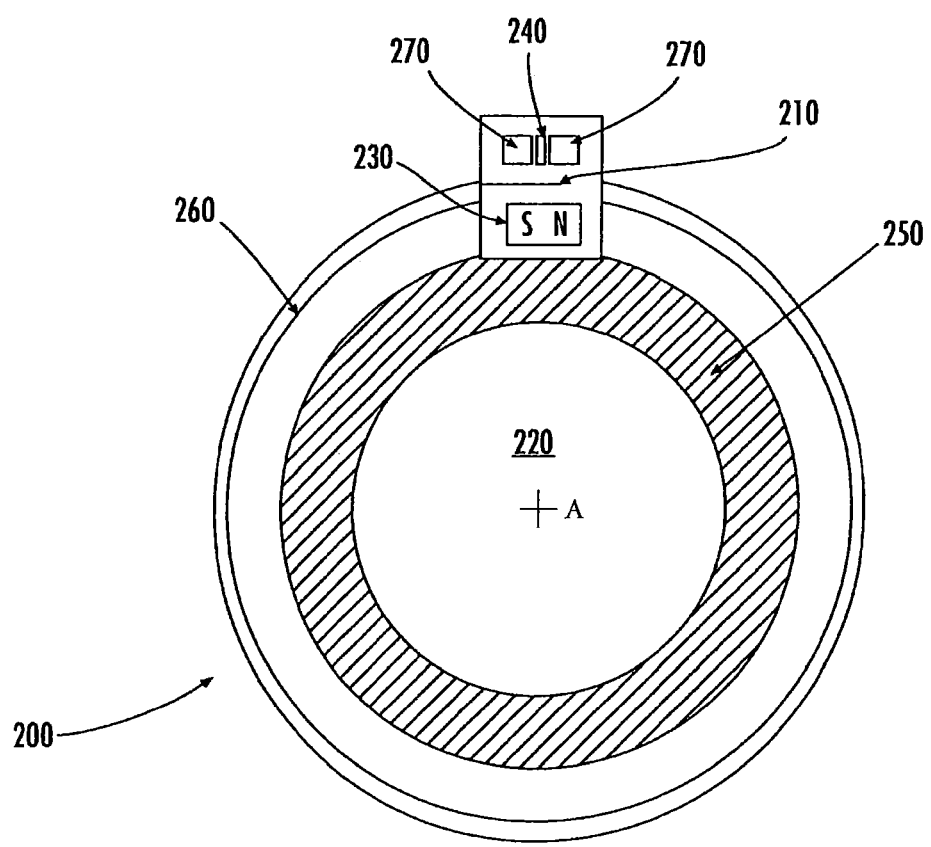
FIG. 3 is an end view of an electromagnetic actuator assembly in accordance with another embodiment of the invention.

An alternative embodiment is shown in FIG. 3. The alternative embodiment is substantially similar to the embodiment described above, except the components of the sensor 200 can be oriented so that the sense direction is transverse to the parasitic magnetic fields' dominant direction, using concentrators 270 to direct sensing field to Hall sensor 240. The body of the sensor 210 is mounted on the solenoid 220 and the plate 250 is displaced axially from the solenoid. The magnet 230 can be oriented with its south pole pointing in the circumferential direction. The Hall element 240 is also oriented so that it senses in the circumferential direction. The Hall element 240 senses the indirect magnetic field. In order to augment the magnetic field through the Hall element 240, a ferrous concentrator 270 is placed on either side of the Hall element 240. The concentrator 270 shape may be optimized for best performance of the sensor 200. Since the magnetic fields produced by the solenoid 220 tend to be strongest in the axial and radial direction, orienting the sensor 200 in the circumferential direction reduces the sensitivity to interference from the solenoid 220. The pole ends of the magnet 230 can also be covered with thicker material to reduce the possibility of accumulating ferrous particles on the sensor 200. Lastly, other orientations of the magnet 230 and other components of the sensor 200 can be contemplated, as long as they achieve the objectives of reducing influence of parasitic magnetic fields.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An electromagnetic actuator assembly having non-engaged and engaged modes, the electromagnetic actuator assembly comprising:
   a solenoid;
   a plate axially displaced from the solenoid, the plate having a first side facing the solenoid and a second side facing away from the solenoid;
   a ferrous target attached to the second side of the plate;
   a sensor body having a first axially extending portion, a second axially extending portion and a radially extending portion connecting the first and second axially extending portions;
   a sensor disposed radially outward from the ferrous target in the second axially extending portion of the sensor body; and
   a magnet disposed radially inward from the ferrous target in the first axially extending portion of the sensor body;
   wherein in the non-engaged mode of the actuator assembly, the ferrous target is not interposed between the sensor and the magnet, and
   wherein in the engaged mode of the actuator assembly, the ferrous target is interposed between the sensor and the magnet.

2. The actuator assembly of claim 1, wherein the sensor is a Hall-effect sensor.

3. The actuator assembly of claim 2 wherein the Hall element is oriented to sense in a circumferential direction relative to an axis of rotation A.

4. The actuator assembly of claim 1, wherein the actuator assembly is part of a rotating locking gearset assembly.

5. The actuator assembly of claim 4, wherein the ferrous target rotates with the locking gearset assembly.

6. The actuator assembly of claim 1, wherein the magnet has a north pole directed radially inward toward an axis of rotation A and a south pole directed radially outward from the axis of rotation A.

7. The actuator assembly of claim 1, wherein the magnet has a north pole and a south pole and wherein the north pole and the south pole are radially equidistant from an axis of rotation A and oriented in a circumferential direction relative to the axis of rotation A.

8. The actuator assembly of claim 7 further comprising at least one concentrator disposed adjacent to the sensor.

9. The actuator assembly of claim 1 further comprising at least one concentrator disposed adjacent to the sensor.

10. A method of sensing the mode of an electromagnetic actuator assembly, the method comprising the steps of:
providing a solenoid;
providing a plate axially displaced from the solenoid, the plate having a first side facing the solenoid and a second side facing away from the solenoid;
providing a ferrous target attached to the second side of the plate;
providing a sensor body having a first axially extending portion, a second axially extending portion and a radially extending portion connecting the first and second axially extending portions;
providing a sensor disposed radially outward from the ferrous target in the second axially extending portion of the sensor body; and
providing a magnet disposed radially inward from the ferrous target in the first axially extending portion of the sensor body;
wherein in the non-engaged mode of the actuator assembly, the ferrous target is in a first position not interposed between the sensor and the magnet, and
wherein in the engaged mode of the actuator assembly, the ferrous target is in a second position interposed between the sensor and the magnet and
wherein the ferrous target is caused to move between the first and second positions as a result of the actuator assembly changing from the non-engaged mode to the engaged mode.

11. The method of claim 10, wherein the magnet has a north pole directed radially inward toward an axis of rotation A and a south pole directed radially outward from the axis of rotation A.

12. The method of claim 10, wherein the magnet has a north pole and a south pole and wherein the north pole and the south pole are radially equidistant from an axis of rotation A and oriented in a circumferential direction relative to the axis of rotation A.

13. The method of claim 12 further comprising the step of providing at least one concentrator disposed adjacent to the sensor.

* * * * *